(No Model.) 2 Sheets—Sheet 2.

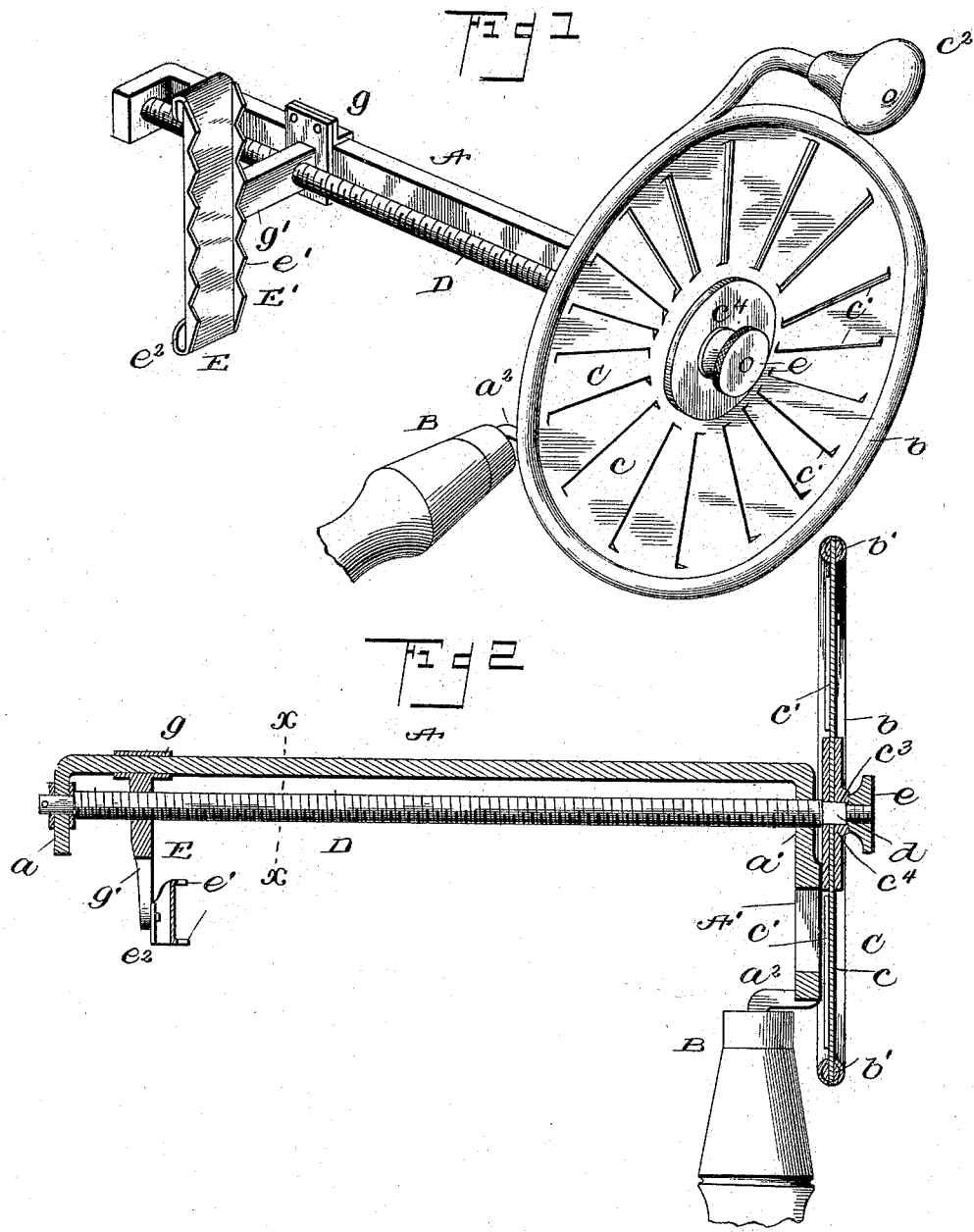

C. M. ASHBY & H. M. SEYBOLD.
CHOCOLATE CUTTER.

No. 488,493. Patented Dec. 20, 1892.

Witnesses

Inventors
Charles M. Ashby
Henry Martin Seybold
By their Attorney
L. Deane.

UNITED STATES PATENT OFFICE.

CHARLES MORRIS ASHBY AND HENRY MARTIN SEYBOLD, OF SIOUX FALLS, SOUTH DAKOTA; SAID ASHBY ASSIGNOR TO HENRY SCHAPER, OF SAME PLACE.

CHOCOLATE-CUTTER.

SPECIFICATION forming part of Letters Patent No. 488,493, dated December 20, 1892.

Application filed February 26, 1892. Serial No. 422,892. (No model.)

*To all whom it may concern:*

Be it known that we, CHARLES MORRIS ASHBY and HENRY MARTIN SEYBOLD, citizens of the United States, residing at Sioux Falls, in the county of Minnehaha and State of South Dakota, have invented certain new and useful Improvements in Chocolate-Cutters; and we do hereby declare the following to be a full, clear, and exact description of the invention, such as will enable others skilled in the art to which it appertains to make and use the same.

My invention relates to an improved chipper or scraper adapted particularly for chipping or preparing for kitchen or table use chocolate, while it is equally applicable, for preparing for such use maple sugar, cheese and such like articles or substances and to these ends the invention consists in the detailed construction and arrangement and combination of the parts substantially as hereinafter more fully disclosed and pointed out in the claims.

Figure 4:
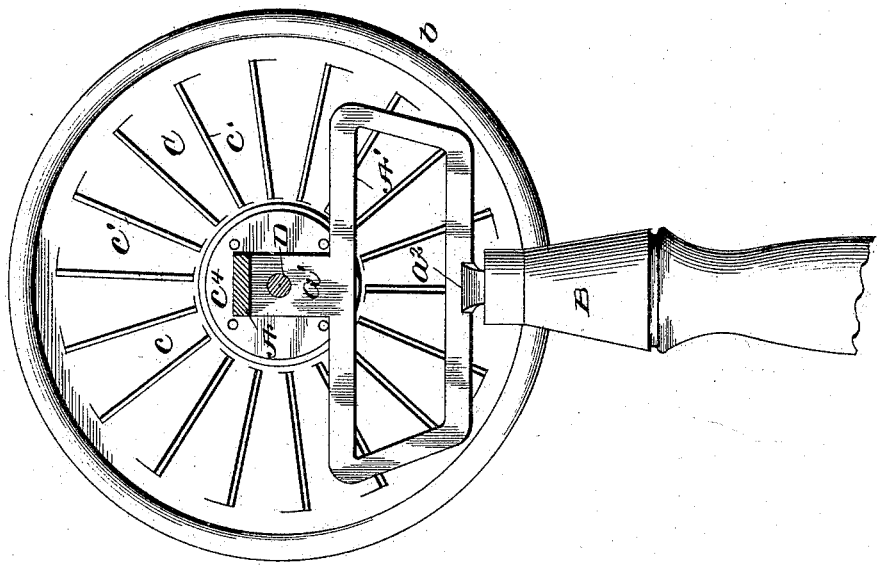
Figure 3:
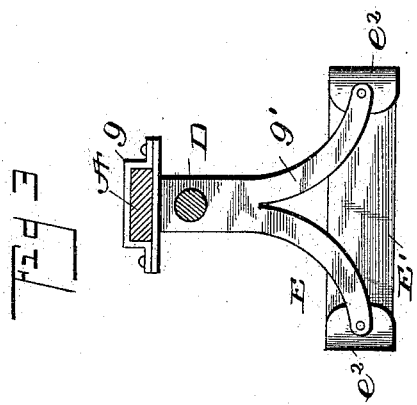

In the accompanying drawings: Figure 1, is a perspective view. Fig. 2, is a longitudinal vertical section through the vertical bracket. Fig. 3, is a transverse sectional view on line $x$—$x$ of Fig. 2 looking to left hand side. Fig. 4, is a transverse vertical section on the line $x$—$x$ of Fig. 2 looking to the right hand side.

In the organization of our invention, we employ a bracket A, in its general outline a rectangular bar, with each end bent so as to form a right angle with the main bar as at $a$ $a'$, one terminating in an approximately rectangular frame A', being adapted to hold one end of the chocolate cake or other substance to be placed therein. Also integral with the frame or holder A', and extending about centrally therefrom, is a right-angled tang-like extension $a^2$, adapted to provide for the attachment thereto of a handle B, for the convenient holding of the chipper or scraper by hand.

C, is the cutter or scraper, proper, in the main, composed of a sheet steel disk $c$, preferably reinforced at the periphery with a relatively broad tire or rim $b$, preferably of sheet-brass incasing a stout wire or core $b'$, giving solidity and weight to the disk for obvious reasons. The steel disk $c$, is stamped or made up with a series of radial knives or blades $c'$, capable of being readily sharpened as occasion may require, and it also has a knobbed handle $c^2$, preferably brazed on its tire or rim for convenience in operating it by hand.

D, is a finely threaded screw, one end of which is rotatably held in the extension $a$, of the bracket-bar A, it may be by washers and a key while, near its other end, it is supported and freely passes through the like extension $a'$, of said bar and is formed with an angular surface or portion $d$, which is received into a corresponding opening $c^3$, in the hubplates $c^4$, of the cutter or scraper C. This end of the screw D, projects beyond the cutter or scraper C, and has an ordinary screw-thread, to permit of the application thereto of a nut $e$, for securing the cutter or scraper thereon by a nut or burr $f$.

E, is a follower or feeder having a sliding connection with the bracket-bar A, by means of a clip or keeper $g$, conformed to the shape thereof and having a vertical bifurcated portion or standard $g'$, provided with a screw-threaded aperture adapted to permit the passage there-through, and have engagement, with the screw D, to provide for imparting movement to the feeder or follower. The follower or feeder also has a holder, or support E', to support one end of the chocolate cake or other article whose opposite end, as above stated, is supported by the frame or support A', of the bracket-bar A. The holder or support E', is preferably rectangular and of sheet-metal and has upper and lower longitudinal rows of projections or teeth $e'$, to engage the chocolate cake or other article, and has its ends bent or turned backward, forming flanges $e^2$, thereon at its back, to provide for the connection thereof to the branches or arms of the bifurcated standard $g'$, supporting the same in position. Of course the thread of the screw D, is relatively graduated with the rotation of the cutter or scraper to provide for the amount of feed it is desired to impart to the follower, thus gaging the thickness or thinness of the chips taken from the chocolate-cake or other substance acted upon by the cutter or scraper.

I now claim:—

1. In a scraper or chipper, the combination, with a screw and its follower, of the bracket adapted to support said screw and follower, and having its forward end provided with a frame or holder to receive one end of the chocolate cake or other substance, substantially as set forth.

2. In a scraper or chipper, the combination, with means for supporting and actuating it, of the follower or feeder consisting of the bifurcated standard having secured to its arms or branches the rectangular sheet metal support or holder having longitudinal rows of teeth or projections and bent backward at its ends, into flanges for connection to said arms or branches, substantially as specified.

3. The scraper or chipper consisting of the bracket-bar having projecting end-extensions one terminating in an approximately rectangular frame or support, itself having integral, right angled tang-like extension for the connection of a handle therewith, the screw supported in said end-extensions and actuated by the cutter or bladed disk, itself provided with a handle, and the follower having a clip or sliding connection with said bracket bar and the bifurcated bar adapted to be actuated by said screw and having connected to its arms or branches the toothed, rectangular sheet-metal support, substantially as set forth.

In testimony whereof we affix our signatures in presence of two witnesses.

CHARLES MORRIS ASHBY.
HENRY MARTIN SEYBOLD.

Witnesses as to Ashby's signature:
WILLIAM W. ANDERSON,
GEO. M. THOMAS.
Witnesses as to Seybold's signature:
BUNT ROGERS,
HENRY SCHAPER.